United States Patent
Kachmar

(10) Patent No.: US 8,238,706 B2
(45) Date of Patent: Aug. 7, 2012

(54) FLAT DROP CABLE WITH MEDIAL BUMP

(75) Inventor: Wayne M. Kachmar, North Bennington, VT (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 13/111,483

(22) Filed: May 19, 2011

(65) Prior Publication Data
US 2011/0286707 A1    Nov. 24, 2011

Related U.S. Application Data

(60) Provisional application No. 61/346,261, filed on May 19, 2010.

(51) Int. Cl.
*G02B 6/44* (2006.01)
(52) U.S. Cl. ........ 385/100; 385/101; 385/102; 385/103; 385/104; 385/105; 385/106; 385/107; 385/108; 385/109; 385/110; 385/111; 385/112; 385/113; 385/114
(58) Field of Classification Search ........... 385/100–114
See application file for complete search history.

(56) References Cited

U.S. PATENT DOCUMENTS

| | | | |
|---|---|---|---|
| 3,991,014 A | 11/1976 | Kleinschuster | |
| 4,067,852 A | 1/1978 | Calundann | |
| 4,083,829 A | 4/1978 | Calundann et al. | |
| 4,089,585 A | 5/1978 | Slaughter et al. | |
| 4,130,545 A | 12/1978 | Calundann | |
| 4,161,470 A | 7/1979 | Calundann | |
| 4,199,225 A | 4/1980 | Slaughter et al. | |
| 4,304,462 A | 12/1981 | Baba et al. | |
| 4,318,842 A | 3/1982 | East et al. | |
| 4,359,598 A | 11/1982 | Dey et al. | |
| 4,401,361 A | 8/1983 | Slaughter | |
| 4,420,220 A | 12/1983 | Dean et al. | |
| 4,468,364 A | 8/1984 | Ide | |
| 4,515,435 A | 5/1985 | Anderson | |
| 4,553,815 A | 11/1985 | Martin | |
| 4,569,420 A | 2/1986 | Pickett et al. | |
| 4,659,174 A | 4/1987 | Ditscheid et al. | |
| 4,715,677 A | 12/1987 | Saito et al. | |

(Continued)

FOREIGN PATENT DOCUMENTS

DE    25 13 723 A1    10/1976
(Continued)

OTHER PUBLICATIONS

ADC Spec Sheet, Fiber Optic Cable, Ruggedized Simplex and Duplex Cables, ADC®, Oct. 2005, 4 pages.

(Continued)

*Primary Examiner* — Brian M. Healy
*Assistant Examiner* — Guy Anderson
(74) *Attorney, Agent, or Firm* — Merchant & Gould P.C.

(57) ABSTRACT

An example fiber optic cable includes an outer jacket having an elongated transverse cross-sectional profile defining a bowtie shape. The outer jacket defines at least first and second separate passages that extend through the outer jacket along a lengthwise axis of the outer jacket. The fiber optic cable includes a plurality of optical fibers positioned within the first passage and a tensile strength member positioned within the second passage. The tensile strength member has a highly flexible construction and a transverse cross-sectional profile that is elongated in the orientation extending along the major axis.

13 Claims, 3 Drawing Sheets

U.S. PATENT DOCUMENTS

| | | | |
|---|---|---|---|
| 4,729,628 A | 3/1988 | Kraft et al. | |
| 4,761,053 A | 8/1988 | Cogelia et al. | |
| 4,807,962 A | 2/1989 | Arroyo et al. | |
| 4,818,060 A | 4/1989 | Arroyo | |
| 4,844,575 A | 7/1989 | Kinard et al. | |
| 4,852,965 A | 8/1989 | Mullin et al. | |
| 4,895,427 A | 1/1990 | Kraft | |
| 4,909,592 A | 3/1990 | Arroyo et al. | |
| 5,015,063 A | 5/1991 | Panuska et al. | |
| 5,125,063 A | 6/1992 | Panuska et al. | |
| 5,157,752 A | 10/1992 | Greveling et al. | |
| 5,214,730 A | 5/1993 | Nagasawa et al. | |
| 5,229,851 A | 7/1993 | Rahman | |
| 5,345,525 A | 9/1994 | Holman et al. | |
| 5,345,526 A | 9/1994 | Blew | |
| 5,448,670 A | 9/1995 | Blew et al. | |
| 5,557,698 A | 9/1996 | Gareis et al. | |
| 5,627,932 A | 5/1997 | Kiel et al. | |
| 5,737,470 A | 4/1998 | Nagano et al. | |
| 5,802,231 A | 9/1998 | Nagano et al. | |
| 5,838,864 A | 11/1998 | Patel et al. | |
| 5,970,196 A | 10/1999 | Greveling et al. | |
| 5,978,536 A | 11/1999 | Brandi et al. | |
| 5,982,966 A | 11/1999 | Bonicel | |
| 6,014,487 A | 1/2000 | Field et al. | |
| 6,088,499 A | 7/2000 | Newton et al. | |
| 6,137,936 A | 10/2000 | Fitz et al. | |
| 6,249,628 B1 | 6/2001 | Rutterman et al. | |
| 6,256,438 B1 | 7/2001 | Gimblet | |
| 6,321,012 B1 | 11/2001 | Shen | |
| 6,347,172 B1 | 2/2002 | Keller et al. | |
| 6,356,690 B1 | 3/2002 | McAlpine et al. | |
| 6,370,303 B1 | 4/2002 | Fitz et al. | |
| 6,434,307 B1 | 8/2002 | Church | |
| 6,493,491 B1 | 12/2002 | Shen et al. | |
| 6,501,888 B2 | 12/2002 | Gimblet et al. | |
| 6,542,674 B1 | 4/2003 | Gimblet | |
| 6,546,175 B1 | 4/2003 | Wagman et al. | |
| 6,621,964 B2 | 9/2003 | Quinn et al. | |
| 6,701,047 B1 | 3/2004 | Rutterman et al. | |
| 6,714,710 B2 | 3/2004 | Gimblet | |
| 6,744,954 B1 | 6/2004 | Tanaka et al. | |
| 6,807,347 B2 | 10/2004 | McAlpine et al. | |
| 6,813,422 B1 | 11/2004 | Krishnamurthy et al. | |
| 6,836,603 B1 | 12/2004 | Bocanegra et al. | |
| 6,901,191 B2 | 5/2005 | Hurley et al. | |
| 6,928,217 B2 | 8/2005 | Mohler et al. | |
| 6,937,801 B2 | 8/2005 | McAlpine et al. | |
| 7,113,680 B2 | 9/2006 | Hurley et al. | |
| 7,197,215 B2 | 3/2007 | Baird et al. | |
| 7,218,821 B2* | 5/2007 | Bocanegra et al. | 385/103 |
| 7,349,642 B2 | 3/2008 | Tatematsu et al. | |
| 7,379,642 B2 | 5/2008 | Kachmar | |
| 7,458,103 B2 | 12/2008 | Citterio et al. | |
| 7,566,474 B2 | 7/2009 | Kachmar | |
| 7,567,741 B2 | 7/2009 | Abernathy et al. | |
| 7,693,375 B2 | 4/2010 | Freeland et al. | |
| 8,041,166 B2 | 10/2011 | Kachmar | |
| 2006/0127016 A1* | 6/2006 | Baird et al. | 385/113 |
| 2006/0159407 A1 | 7/2006 | Kachmar | |
| 2006/0291787 A1 | 12/2006 | Seddon | |
| 2007/0127878 A1 | 6/2007 | de Montmorillon et al. | |
| 2007/0280615 A1 | 12/2007 | de Montmorillon et al. | |
| 2008/0080822 A1* | 4/2008 | Chiasson | 385/114 |
| 2008/0187276 A1 | 8/2008 | Roberts et al. | |
| 2009/0274425 A1 | 11/2009 | Caldwell et al. | |
| 2009/0297104 A1 | 12/2009 | Kachmar | |
| 2009/0317039 A1 | 12/2009 | Blazer et al. | |
| 2009/0317047 A1 | 12/2009 | Smith et al. | |
| 2010/0046894 A1 | 2/2010 | Kachmar | |

FOREIGN PATENT DOCUMENTS

| | | |
|---|---|---|
| DE | 20 2007 006 658 U1 | 8/2007 |
| GB | 1 483 845 | 8/1977 |
| GB | 2 096 343 A | 10/1982 |
| GB | 2 296 575 A | 7/1996 |
| JP | 2000-121893 | 4/2000 |
| KR | 10-2003-0007789 | 1/2003 |
| KR | 10-2004-0063754 | 7/2004 |
| WO | WO 96/15466 | 5/1996 |

OTHER PUBLICATIONS

ADC Spec Sheet, Fiber Optic Cable, Tactical Cables, ADC®, Oct. 2005, 4 pages.

Fiber Optic Cable LCF™ Microcable: Plenum, *ADC Telecommunications, Inc.*, 4 pages (Copyright 2005).

International Search Report and Written Opinion mailed Feb. 1, 2010.

Superior Essex, FTTP Tight Buffered Indoor/Outdoor Drop, Series W7, RoHS, Product Bulletin, OSP Fiber Produtcs, Nov. 2008, 2 pages.

International Search Report and Written Opinion mailed Jan. 10, 2012.

* cited by examiner

FLAT DROP CABLE WITH MEDIAL BUMP

CROSS-REFERENCE TO RELATED APPLICATION

The present application claims the benefit of U.S. Provisional Patent Application Ser. No. 61/346,261, filed May 19, 2010, which application is hereby incorporated by reference in its entirety.

BACKGROUND

A fiber optic cable typically includes: (1) an optical fiber; (2) a buffer layer that surrounds the optical fiber; (3) a plurality of reinforcing members loosely surrounding the buffer layer; and (4) an outer jacket. Optical fibers function to carry optical signals. A typical optical fiber includes an inner core surrounded by a cladding that is protected by a coating. The buffer layer functions to surround and protect the coated optical fibers. Reinforcing members add mechanical reinforcement to fiber optic cables to protect the internal optical fibers against stresses applied to the cables during installation and thereafter. Outer jackets also provide protection against chemical damage.

Drop cables used in fiber optic networks can be constructed having a jacket with a flat transverse profile. Such cables typically include a central buffer tube containing a plurality of optical fibers, and reinforcing members such as rods made of glass reinforced epoxy embedded in the jacket on opposite sides of the buffer tube. U.S. Pat. No. 6,542,674 discloses a drop cable of a type described above. Flat drop cables of the type described above are designed to be quite robust. However, as a result of such cables being strong and robust, such cables are typically quite stiff, inflexible and difficult to handle. Additionally, such cables can be expensive to manufacture.

SUMMARY

The present disclosure relates to a fiber optic cable including an outer jacket having an elongated transverse cross-sectional profile. The transverse cross-sectional profile has a medial bump region located two outer contour regions. In some implementations, pinched regions separate the medial bump region from the outer contour regions. The outer jacket also defines first and second separate passages that extend through the outer jacket along a lengthwise axis of the outer jacket. The fiber optic cable also includes a plurality of optical fibers positioned within the first passage a tensile strength member positioned within the second passage. The tensile strength member has a highly flexible construction and a transverse cross-sectional profile that is elongated in the orientation extending along the major axis.

A variety of additional aspects will be set forth in the description that follows. These aspects can relate to individual features and to combinations of features. It is to be understood that both the foregoing general description and the following detailed description are exemplary and explanatory only and are not restricted of the broad concepts upon which the embodiments disclosed herein are based.

DETAILED DESCRIPTION

Figure 1:
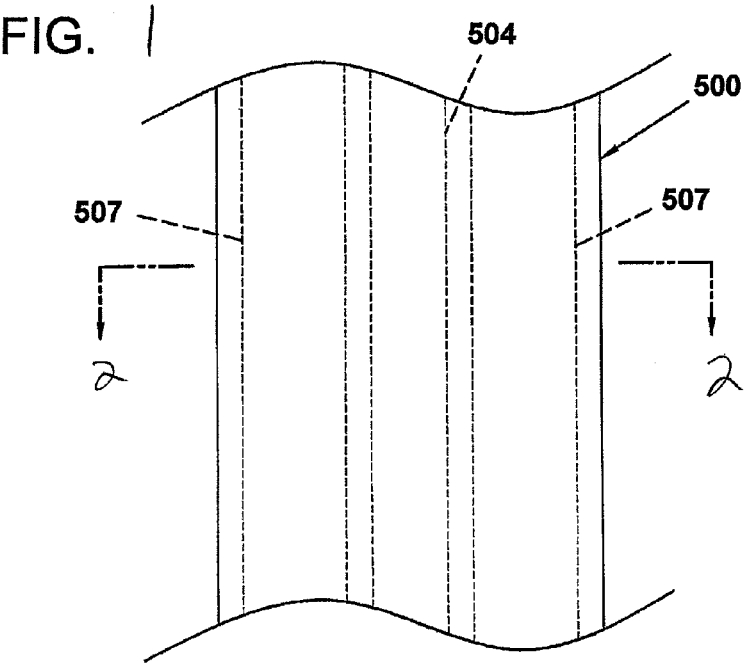
FIG. 1 is a top plan view of a fiber optic cable in accordance with the principles of the present disclosure.
Figure 2:
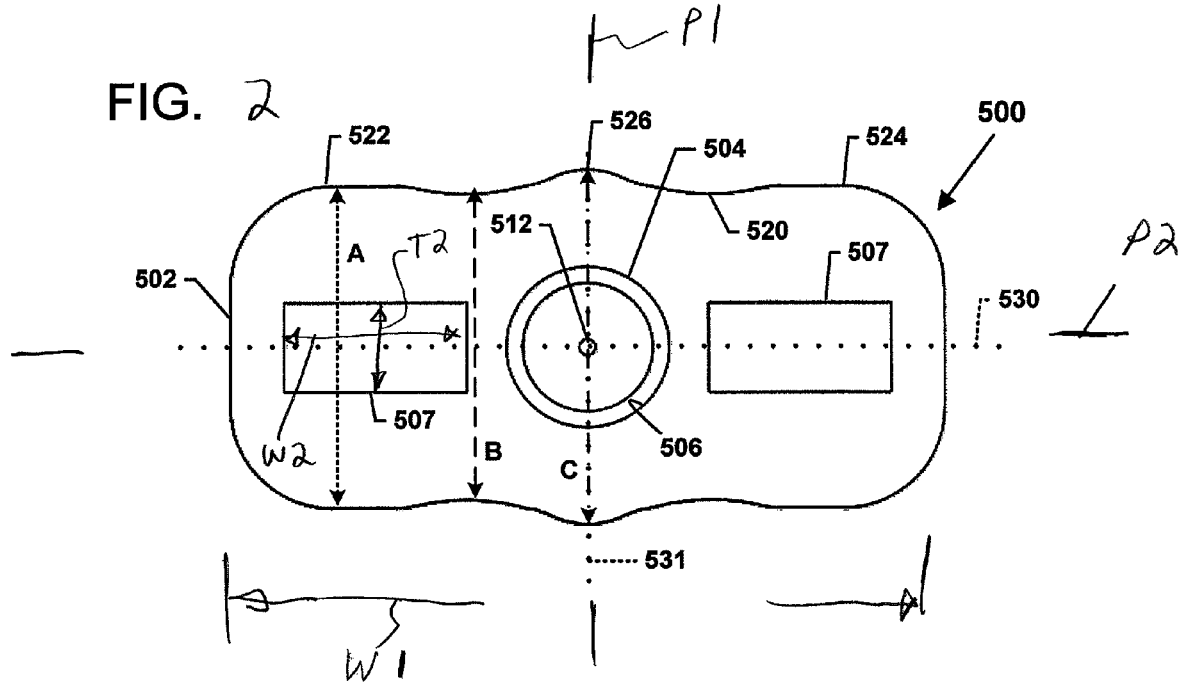
FIG. 2 is a transverse cross-sectional view of the fiber optic cable of FIG. 1 taken along section line 2-2.

FIGS. 1 and 2 show a fiber optic cable 500 (e.g., a drop cable) in accordance with the principles of the present disclosure. The drop cable 500 includes an outer jacket 502 surrounding at least one optical fiber 512. At least one strength member 507 also is embedded in the outer jacket 502. In the example shown, the optical fiber 512 is positioned between two strength members 507. The outer jacket 502 has a non-circular outer profile.

In some implementations, the fibers 512 are routed through a passage 506 defined in the outer jacket 502 without a buffer. For example, in one implementation, strands of the optical fibers 512 are loosely routed through the passage 506 defined in the outer jacket 502. In another implementation, ribbonized optical fibers 512 are routed through the passage 506. In other implementations, however, the optical fiber 512 is contained within a buffer tube 504 routed axially through the passage 506. In one implementation, the buffer tube 504 includes a tight buffer around a single optical fiber 512. In another implementation, the buffer tube 504 includes a loose buffer around one or more strands of optical fibers 512. In another implementation, the buffer tube 504 includes a loose buffer around ribbonized optical fibers 512.

The outer jacket 502 is longer along a major axis 530 than along a minor axis 531. The major and minor axes 530, 531 are perpendicular to one another and intersect at a center of the outer jacket 502. The width of the outer jacket 502 is taken along the major axis 530 and the thickness of the outer jacket 502 is taken along the minor axis 531. In the example shown, the transverse cross-sectional profile of the cable 500 is generally symmetrical about the major and minor axes 530, 531. In other implementations, however, the cable 500 can be asymmetrical.

For example, as shown at FIG. 2, when viewed in transverse cross-section, the outer profile of the outer jacket 502 has a generally obround shape with two intermediate pinched regions 520. The pinched regions 520 define a medial bump region 526 between two outer contour regions 522, 524 on each side of the flat cable 500. The optical fibers 512 are routed axially along the medial bump section 526 of the cable 500. The reinforcing members 507 are routed along the outer contour sections 522, 524. In one example implementation, the medial bump region 526 peaks along the minor axis 531.

As shown in FIG. 2, the cable 500 has a first thickness A at the outer contour regions 522, 524, a second thickness B at the pinched regions 520, and a third thickness C at the medial bump region 526 (e.g., along the minor axis 531). In general, the pinched regions 520 define the minimum thickness of the cable 500. Accordingly, the second thickness B is less than the first thickness A and the second thickness B is less than the third thickness C. In accordance with some aspects, the third thickness C of the medial bump region 526 defines the maximum thickness of the cable 500. Accordingly, the third thickness C is at least as large as the first thickness A of the contour regions 522, 524. In some implementations, the third thickness C is greater than the first thickness A.

It will be appreciated that the outer jacket 502 can be made of any number of different types of polymeric materials. In one embodiment, the outer jacket 16 is made of a medium density ultra-high molecular weight polyethylene.

The buffer tube 504 can also be made of any number of different polymeric materials. For example, the buffer tube 14 can be made of a polymeric material such as polyvinyl chloride (PVC). Other polymeric materials (e.g., polyethylenes, polyurethanes, polypropylenes, polyvinylidene fluorides, ethylene vinyl acetate, nylon, polyester, or other materials) may also be used.

Figure 3:
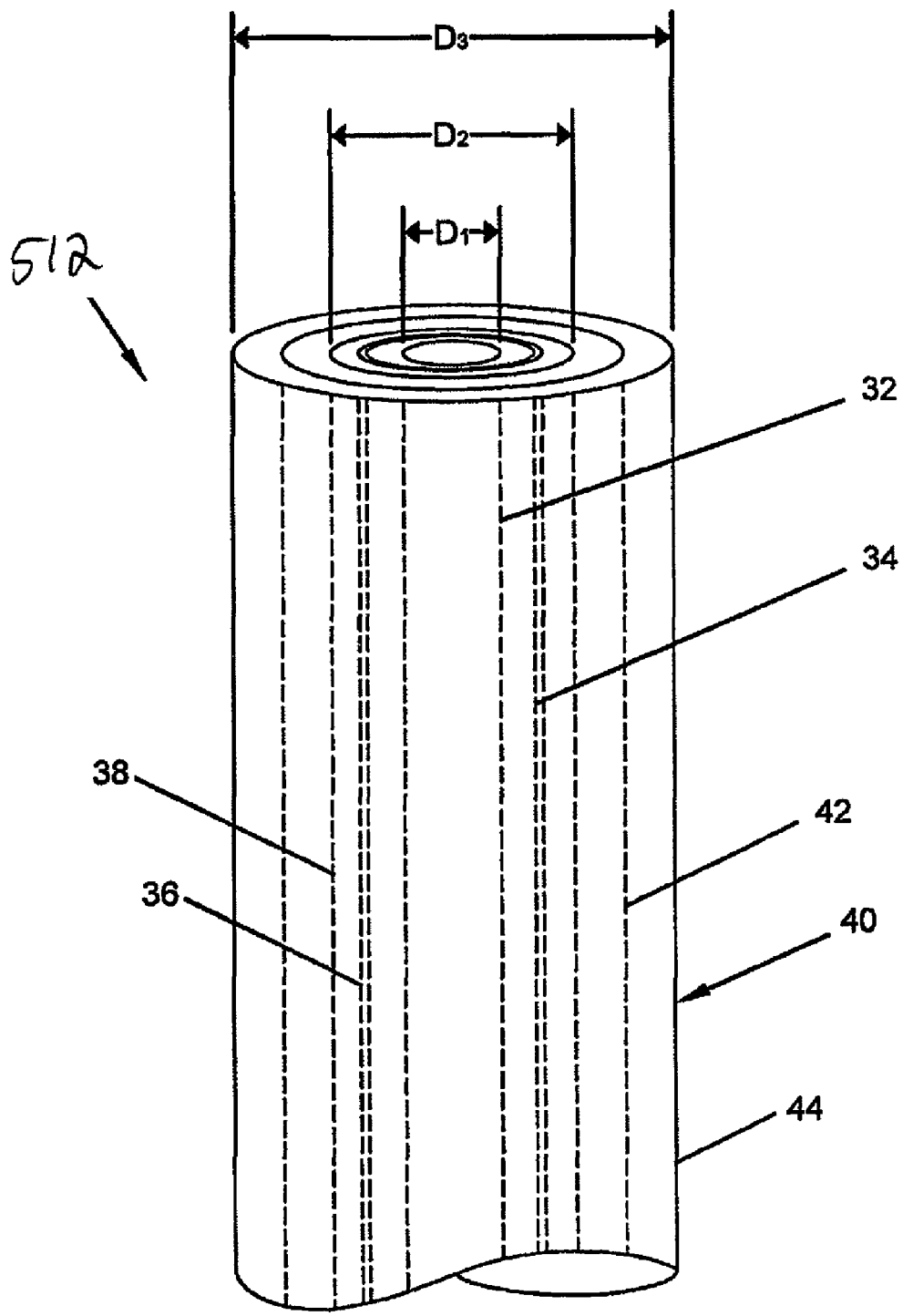
FIG. 3 is a perspective view of an optical fiber suitable for use in the fiber optic cable of FIG. 1.

It will be appreciated that one or more optical fibers 512 can be positioned within the cable 500. In a preferred embodiment, the cable 500 contains at least twelve optical fibers 12. It will be appreciated that the optical fibers 512 can have any number of different types of configurations. In an embodiment shown at FIG. 3, an example structure for one of the fibers 512 is shown. The optical fiber 512 includes a core 32. The core 32 is made of a glass material, such as a silica-based material, having an index of refraction. In the subject embodiment, the core 32 has an outer diameter $D_1$ of less than or equal to about 10 µm.

The core 32 of each optical fiber 512 is surrounded by a first cladding layer 34 that is also made of a glass material, such as a silica based-material. The first cladding layer 34 has an index of refraction that is less than the index of refraction of the core 32. This difference between the index of refraction of the first cladding layer 34 and the index of refraction of the core 32 allows an optical signal that is transmitted through the optical fiber 12 to be confined to the core 32.

A trench layer 36 surrounds the first cladding layer 34. The trench layer 36 has an index of refraction that is less than the index of refraction of the first cladding layer 34. In the subject embodiment, the trench layer 36 is immediately adjacent to the first cladding layer 34.

A second cladding layer 38 surrounds the trench layer 36. The second cladding layer 38 has an index of refraction. In the subject embodiment, the index of refraction of the second cladding layer 38 is about equal to the index of refraction of the first cladding layer 34. The second cladding layer 38 is immediately adjacent to the trench layer 36. In the subject embodiment, the second cladding layer 38 has an outer diameter $D_2$ of less than or equal to 125 µm.

A coating, generally designated 40, surrounds the second cladding layer 38. The coating 40 includes an inner layer 42 and an outer layer 44. In the subject embodiment, the inner layer 42 of the coating 40 is immediately adjacent to the second cladding layer 38 such that the inner layer 42 surrounds the second cladding layer 38. The inner layer 42 is a polymeric material (e.g., polyvinyl chloride, polyethylenes, polyurethanes, polypropylenes, polyvinylidene fluorides, ethylene vinyl acetate, nylon, polyester, or other materials) having a low modulus of elasticity. The low modulus of elasticity of the inner layer 42 functions to protect the optical fiber 512 from microbending.

The outer layer 44 of the coating 40 is a polymeric material having a higher modulus of elasticity than the inner layer 42. In the subject embodiment, the outer layer 44 of the coating 40 is immediately adjacent to the inner layer 42 such that the outer layer 44 surrounds the inner layer 42. The higher modulus of elasticity of the outer layer 44 functions to mechanically protect and retain the shape of optical fiber 12 during handling. In the subject embodiment, the outer layer 44 defines an outer diameter $D_3$ of less than or equal to 500 µm. In another embodiment, the outer layer 44 has an outer diameter $D_3$ of less than or equal to 250 µm.

In the subject embodiment, the optical fiber 512 is manufactured to reduce the sensitivity of the optical fiber 12 to micro or macro-bending (hereinafter referred to as "bend-insensitive"). An exemplary bend insensitive optical fiber has been described in U.S. Pat. Application Publication Nos. 2007/0127878 and 2007/0280615 that are hereby incorporated by reference in their entirety. An exemplary bend-insensitive optical fiber is commercially available from Draka Comteq under the name BendBright XS.

It will be appreciated that the cable of FIGS. 1 and 2 can be used as drop cables in a fiber optic network. For example, the fiber optic cable can be used as drop cables in fiber optic networks such as the networks disclosed in U.S. Provisional Patent Application Ser. No. 61/098,494, entitled "Methods and Systems for Distributing Fiber Optic Telecommunications Services to a Local Area," filed on Sep. 19, 2008 and hereby incorporated by reference in its entirety.

Figure 5:
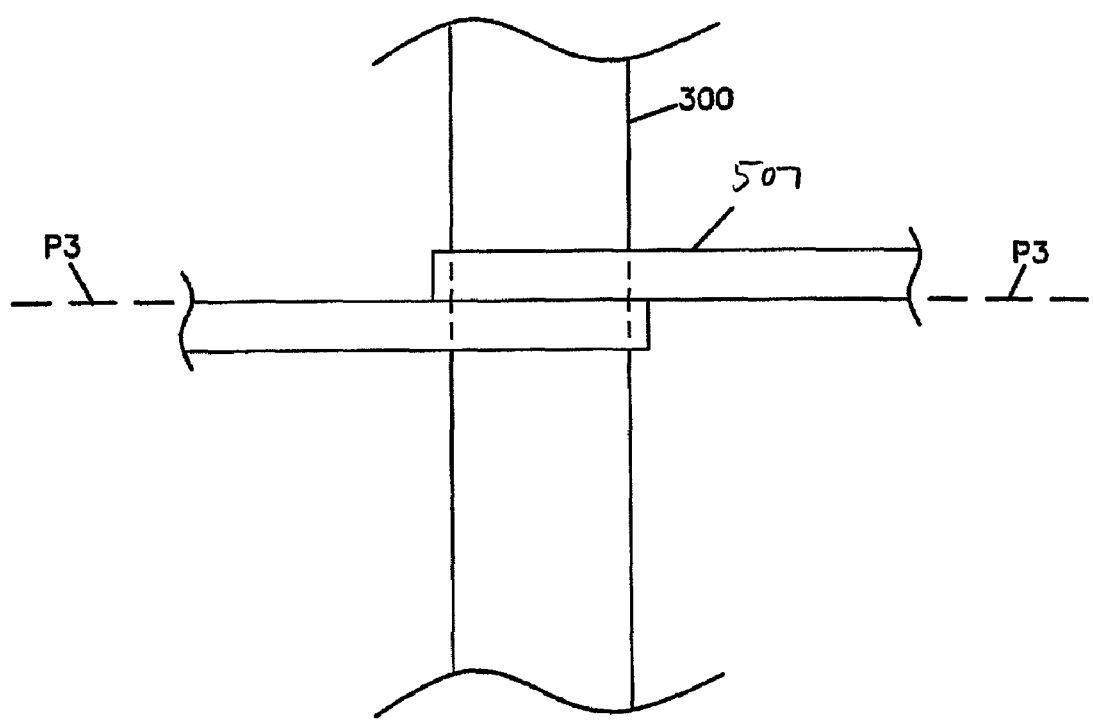
FIG. 5 is a top view of the test system of FIG. 4.

The cable 500 has an elongated transverse cross-sectional profile (e.g., a flattened cross-sectional profile, an oblong cross-sectional profile, an obround cross-sectional profile, etc.) defined by the outer jacket 502. A width W1 of the outer jacket profile extends along the major axis 530 and the thicknesses A, B and C of the outer jacket profile extends along the minor axis 531. The width W1 is longer than the thicknesses A, B and C. In certain embodiments, the width W1 is at least 50% longer than the thickness C. As depicted in FIG. 5, the width W1 is a maximum width of the outer jacket profile and the thickness C is a maximum thickness of the outer jacket profile.

In the depicted embodiment of FIG. 2, the transverse cross-sectional profile defined by the outer jacket 502 of is generally rectangular with rounded ends. The major axis 530 and the minor axis 531 intersect perpendicularly at a central lengthwise axis of the cable 500.

The construction of the cable 500 allows the cable 500 to be bent more easily along a plane P1 that coincides with the minor axis 531 than along a plane P2 that coincides with the major axis. Thus, when the cable 500 is wrapped around a spool or guide, the cable 500 is preferably bent along the plane P1.

As indicated above, the outer jacket 502 defines the elongate transverse cross-sectional profile of the cable 500. The central passage 506 and the strength members 507 are aligned along the major axis 530 of the cable 500. The passage 506 has a generally circular transverse cross-sectional profile while the strength members 507 and their corresponding passages within the jacket 502 have elongate transverse cross-sectional profiles. For example, the strength members 507 have transverse cross-sectional profiles that are elongated in an orientation that extends along the major axis 530 of the cable 500.

It will be appreciated that the outer jacket 502 of the cable 500 can be shaped through an extrusion process and can be made by any number of different types of polymeric materials. In certain embodiments, the outer jacket 502 can have a construction the resists post-extrusion shrinkage of the outer jacket 502. For example, the outer jacket 502 can include a shrinkage reduction material disposed within a polymeric base material (e.g., polyethylene). U.S. Pat. No. 7,379,642, which is hereby incorporated by reference in its entirety, describes an exemplary use of shrinkage reduction material within the base material of a fiber optic cable jacket.

In one embodiment, the shrinkage reduction material is a liquid crystal polymer (LCP). Examples of liquid crystal polymers suitable for use in fiber-optic cables are described in U.S. Pat. Nos. 3,911,041; 4,067,852; 4,083,829; 4,130,545; 4,161,470; 4,318,842; and 4,468,364 which are hereby incorporated by reference in their entireties. To promote flexibility of the cable 500, the concentration of shrinkage material (e.g. LCP) is relatively small as compared to the base material. In one embodiment, and by way of example only, the shrinkage reduction material constitutes less than about 10% of the total weight of the outer jacket 502. In another embodiment, and by way of example only, the shrinkage reduction material constitutes less than about 5% of the total weight of the outer jacket 502. In another embodiment, the shrinkage reduction material constitutes less than about 2% of the total weight of the outer jacket 502. In another embodiment, shrinkage reduction material constitutes less than about 1.9%, less than about 1.8%, less than 1.7%, less than about 1.6%, less than about 1.5%, less than about 1.4%, less than about 1.3%, less than about 1.2%, less than about 1.1%, or less than about 1.0% of the total weight of the outer jacket 502.

Example base materials for the outer jacket 502 include low-smoke zero halogen materials such as low-smoke zero halogen polyolefin and polycarbon. In other embodiments, the base material can include thermal plastic materials such as polyethylene, polypropylene, ethylene-propylene, copolymers, polystyrene and styrene copolymers, polyvinyl chloride, polyamide (nylon), polyesters such as polyethylene terephthalate, polyetheretherketone, polyphenylene sulfide, polyetherimide, polybutylene terephthalate, as well as other plastic materials. In still other embodiments, the outer jacket 502 can be made of low density, medium density or high density polyethylene materials. Such polyethylene materials can include low density, medium density or high density ultra-high molecular weight polyethylene materials.

The passage 506 of the outer jacket 502 is sized to receive one or more of the bend insensitive fibers 512. The bend insensitive fibers are preferably unbuffered and in certain embodiments have outer diameters in the range of 230-270 μm. In one embodiment, the passage 506 is sized to receive at least 12 of the bend insensitive fibers 512. When the fibers 512 are positioned within the passage 506, it is preferred for the fibers 512 to occupy less than 60% of the total transverse cross-sectional area defined by the passage 506.

It is preferred for the passage 506 to be dry and not to be filled with a water-blocking gel. Instead, to prevent water from migrating along the first passage 104, structures such water-swellable fibers, water-swellable tape, or water-swellable yarn can be provided within the passage 506 along with the fibers 512. However, in certain embodiments water-blocking gel may be used.

The strength members 507 of the cable 500 preferably each have a transverse cross-sectional profile that matches the transverse cross-sectional profile of their corresponding passage defined by the jacket 502. As shown at FIG. 2, the strength members 507 have a transverse cross-sectional width W2 that is greater than a transverse cross-sectional thickness T2 of the strength members 507. The width W2 extends along the major axis 530 of the cable while the thickness T2 extends along the minor axis 531 of the cable 100. In the depicted embodiment, the thickness T2 is bisected by the major axis 530. In certain embodiments, the width W2 of each strength member 507 is at least 50% longer than the thickness T2, or the width W2 of each strength member 507 is at least 75% longer than the thickness T2, or the width W2 of each strength member 507 is at least 100% longer than the thickness T2, or the width W2 of each strength member 507 is at least 200% longer than the thickness T2, or the width W2 of each strength member 507 is at least 300% longer than the thickness T2, or the width W2 of each strength member 507 is at least 400% longer than the thickness T2. As depicted in FIG. 2, the width W2 is a maximum width of each strength member 507 and the thickness T2 is a maximum thickness of each strength member 507.

In certain embodiments, the strength members 507 are bonded to the outer jacket 502. The bonding between the strength members 507 and the outer jacket 502 can be chemical bonding or thermal bonding. In one embodiment, the strength members 507 may be coated with or otherwise provided with a material having bonding characteristics (e.g., ethylene acetate) to bond the strength members 507 to the outer jacket 502.

The strength members 507 preferably have a construction that is highly flexible and highly strong in tension. For example, in certain embodiments, the strength members 507 provide the vast majority of the tensile load capacity of the cable 500. For example, in one embodiment, the strength members 507 carry at least 95% of a 150 pound tensile load applied to the cable 500 in a direction along the lengthwise axis of the cable. In one embodiment, the strength members 507 can carry a 150 pound tensile load applied in an orientation extending along a central longitudinal axis of each strength member 507 without undergoing meaningful deterioration of the tensile properties of the strength members 507. In another embodiment, the strength members 507 can carry a 200 pound tensile load applied in an orientation extending along central longitudinal axes of the strength members 507 without undergoing meaningful deterioration of the tensile properties of the strength members. In still another embodiment, the strength members 507 can carry a 300 pound tensile load applied in an orientation that extends along the central longitudinal axes of the strength members 507 without experiencing meaningful deterioration of their tensile properties.

Figure 4:
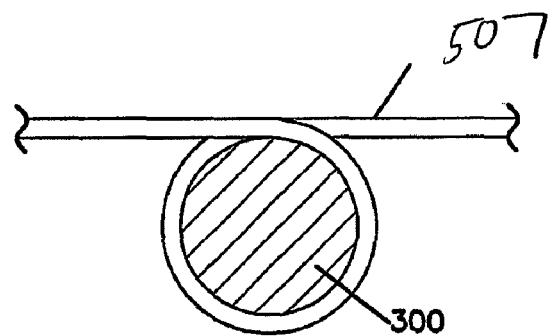
FIG. 4 is an end view of a test system for testing the flexibility of the strength members of the fiber optic cable of FIGS. 1 and 2.

It is preferred for the strength members 507 to be able to provide the tensile strengths described above while concurrently being highly flexible. In determining the tensile strength of the cable 500, tensile load is applied to the cable 500 in a direction that extends along the lengthwise axis of the cable 100. Similarly, to determine the tensile strength of the strength members 507, tensile load is applied to the strength members 507 in a direction that extends along central longitudinal axes of the strength members 507. In one embodiment, a strength member 507 having tensile strength characteristics as described above also has a flexibility that allows the strength member 507 to be wrapped at least 360 degrees around a mandrel 300 (see FIGS. 4 and 5) having a 10 millimeter outer diameter for one hour without undergoing/experiencing meaningful deterioration/degradation of the tensile strength properties of the strength member 507. As shown at FIGS. 4 and 5, the 360 degree wrap is aligned generally along a single plane P3 (i.e., the 360 degree wrap does not form a helix having an extended axial length). In this way, the strength member 507 conforms to the outer diameter of the mandrel and generally forms a circle having an inner diameter of 10 millimeters. This test can be referred to as the "mandrel wrap" test. In certain embodiments, the strength member 507 maintains at least 95% of its pre-mandrel wrap test tensile strength after having been subjected to the mandrel wrap test. In certain embodiments, the strength member 507 does not "broom stick" when subjected to the mandrel wrap test described. As used herein, the term "broom stick" means to have reinforcing elements of the strength member visually separate from the main body of the strength member 507. In certain embodiments, the strength member 507 does not generate any audible cracking when exposed to the mandrel wrap test.

In certain embodiments, each strength member 507 is formed by a generally flat layer of reinforcing elements (e.g., fibers or yarns such as aramid fibers or yarns) embedded or otherwise integrated within a binder to form a flat reinforcing structure (e.g., a structure such as a sheet-like structure, a film-like structure, or a tape-like structure). In one example embodiment, the binder is a polymeric material such as ethylene acetate acrylite (e.g., UV-cured, etc.), silicon (e.g., RTV, etc.), polyester films (e.g., biaxially oriented polyethylene terephthalate polyester film, etc.), and polyisobutylene. In other example instances, the binder may be a matrix material, an adhesive material, a finish material, or another type of material that binds, couples or otherwise mechanically links together reinforcing elements.

In other embodiments, each strength member 507 can have a glass reinforced polymer (GRP) construction. The glass reinforced polymer can include a polymer base material reinforced by a plurality of glass fibers such as E-glass, S-glass or other types of glass fiber. The polymer used in the glass reinforced polymer is preferably relatively soft and flexible after curing. For example, in one embodiment, the polymer has a Shore A hardness less than 50 after curing. In other embodiments, the polymer has a Shore A hardness less than 46 after curing. In certain other embodiments, the polymer has a Shore A hardness in the range of about 34-46.

In one embodiment, each strength member 507 can have a width of about 0.085 inches and a thickness of about 0.045 inches. In another embodiment, such a strength member may have a width of about 0.125 inches and a thickness of about 0.030 inches. In still further embodiments, the strength member has a thickness in the range of 0.020-0.040 inches, or in the range of 0.010-0.040 inches, or in the range of 0.025-0.035 inches. Of course, other dimensions could be used as well. In additional embodiments, the strength member may have a width in the range of 0.070-0.150 inches. Of course, other sizes could be used as well.

In certain embodiments, the strength member 507 preferably does not provide the cable 100 with meaningful resistance to compression loading in an orientation extending along the lengthwise axis of the cable 500. For example, in certain embodiments, the outer jacket 502 provides greater resistance to compression than the strength member 507 in an orientation extending along the lengthwise cable axis. Thus, in certain embodiments, the reinforcing members 507 do not provide the cable 500 with meaningful compressive reinforcement in an orientation that extends along the lengthwise axis. Rather, resistance to shrinkage or other compression of the cable 500 along the lengthwise axis can be provided by the outer jacket 502 itself through the provision of the shrinkage reduction material within the base material of the outer jacket 502. In this type of embodiment, when a compressive load is applied to the cable 500 along the lengthwise axis, a vast majority of the compressive load will be carried by the outer jacket 502 as compared to the strength members 507.

The above specification provides examples of how certain inventive aspects may be put into practice. It will be appreciated that the inventive aspects can be practiced in other ways than those specifically shown and described herein without departing from the spirit and scope of the inventive aspects of the present disclosure. For example, the cable 500 having the medial bump region 526 is described in combination with strength members 507. In other implementations, however, the medial bump design can be used with other types of cables including other types of strength members (e.g., more rigid strength members capable of supporting compression loading such as relatively stiff rods formed by a resin (e.g., epoxy) that is reinforced with glass fibers (e.g., fiberglass rovings)).

The invention claimed is:

1. A fiber optic cable comprising:
an outer jacket having an elongated transverse cross-sectional profile defining a medial bump region disposed between outer contour regions, the elongated transverse cross-sectional profile having a maximum thickness at the medial bump region, the outer jacket also defining at least a first passage that extends axially through the outer jacket along the medial bump region;
at least one optical fiber positioned within the first passage;
a first tensile strength member extending axially through the outer jacket on a first side of the first passage; and
a second tensile strength member extending axially through the outer jacket on a second side of the first passage;
wherein the elongated transverse cross-sectional profile of the outer jacket includes pinched regions located on opposite sides of the first passage to separate the medial bump region from the outer contour regions;
wherein a width of the cable is at least 50% longer than the maximum thickness of the cable.

2. The fiber optic cable of claim 1, wherein the outer jacket of the fiber optic cable has a major axis and a minor axis that is perpendicular to the major axis, and wherein the medial bump region peaks at the minor axis of the fiber optic cable.

3. The fiber optic cable of claim 2, wherein the first and second tensile strength members are aligned along the major axis of the fiber optic cable.

4. The fiber optic cable of claim 1, wherein a thickness of the outer jacket at the outer contour region is less than the maximum thickness at the medial bump region.

5. The fiber optic cable of claim 1, wherein the first and second tensile strength members extend along the outer contour regions of the outer jacket.

6. The fiber optic cable of claim 1, wherein the first and second tensile strength members are bonded to the outer jacket.

7. The fiber optic cable of claim 1, wherein the first and second tensile strength members each have an elongated transverse cross-sectional profile.

8. The fiber optic cable of claim 1, wherein the first passage is lined with a buffer tube.

9. The fiber optic cable of claim 1, wherein when the outer jacket is viewed in transverse cross-section, the outer jacket has a first thickness at a medial point that is greater than a second thickness taken at any other point on the fiber optic cable.

10. The fiber optic cable of claim 1, wherein each of the tensile strength members is sufficiently flexible to be wrapped in a circle having a 10 millimeter inner diameter for one hour without undergoing meaningful deterioration in tensile strength.

11. A fiber optic cable comprising:
an outer jacket having an elongated transverse cross-sectional profile defining a medial bump region, the elongated transverse cross-sectional profile having a maximum thickness at the medial bump region, the outer jacket also defining at least a first passage that extends axially through the outer jacket along the medial bump region;
at least one optical fiber positioned within the first passage;
a first tensile strength member extending axially through the outer jacket on a first side of the first passage; and
a second tensile strength member extending axially through the outer jacket on a second side of the first passage;
wherein a width of the cable is at least 50% longer than the maximum thickness of the cable.

12. A fiber optic cable comprising:
an outer jacket having a major axis and a minor axis that is perpendicular to the major axis, the outer jacket also having an elongated transverse cross-sectional profile defining a medial bump region disposed between outer contour regions and peaking at the minor axis, the elongated transverse cross-sectional profile having a maximum thickness at the medial bump region, the outer jacket also defining at least a first passage that extends axially through the outer jacket along the medial bump region;

at least one optical fiber positioned within the first passage; and a first tensile strength member extending axially through the outer jacket on a first side of the first passage; and a second tensile strength member extending axially through the outer jacket on a second side of the first passage;

wherein the elongated transverse cross-sectional profile of the outer jacket includes pinched regions located on opposite sides of the first passage to separate the medial bump region from the outer contour regions.

13. A fiber optic cable comprising:

an outer jacket having an elongated transverse cross-sectional profile defining a medial bump region disposed between outer contour regions, the elongated transverse cross-sectional profile having a maximum thickness at the medial bump region, the outer jacket also defining at least a first passage that extends axially through the outer jacket along the medial bump region;

at least one optical fiber positioned within the first passage; and a first tensile strength member extending axially through the outer jacket on a first side of the first passage; and a second tensile strength member extending axially through the outer jacket on a second side of the first passage;

wherein the elongated transverse cross-sectional profile of the outer jacket includes pinched regions located on opposite sides of the first passage to separate the medial bump region from the outer contour regions; and wherein when the outer jacket is viewed in transverse cross-section, the outer jacket has a first thickness at a medial point that is greater than a second thickness taken at any other point on the fiber optic cable.

\* \* \* \* \*